(12) United States Patent
Mizuno

(10) Patent No.: US 7,694,092 B2
(45) Date of Patent: Apr. 6, 2010

(54) STORAGE SUBSYSTEM AND BACK-UP/RECOVERY METHOD

(75) Inventor: Yoichi Mizuno, Yokohama (JP)

(73) Assignees: Hitachi, Ltd., Tokyo (JP); Hitachi Computer Peripheral Co., Ltd., Kanagawa-ken (JP)

( * ) Notice: Subject to any disclaimer, the term of this patent is extended or adjusted under 35 U.S.C. 154(b) by 549 days.

(21) Appl. No.: 11/598,985

(22) Filed: Nov. 13, 2006

(65) Prior Publication Data

US 2008/0059734 A1 Mar. 6, 2008

(30) Foreign Application Priority Data

Sep. 6, 2006 (JP) .............................. 2006-241085

(51) Int. Cl.
  *G06F 12/00* (2006.01)
  *G06F 13/00* (2006.01)
  *G06F 13/28* (2006.01)
  *G06F 7/00* (2006.01)
  *G06F 17/00* (2006.01)

(52) U.S. Cl. ................... 711/162; 711/154; 711/161; 711/165; 707/640; 707/648; 707/668

(58) Field of Classification Search .................. 711/162
See application file for complete search history.

(56) References Cited

U.S. PATENT DOCUMENTS

| 2004/0193945 A1 | 9/2004 | Eguchi et al. | |
| 2004/0268067 A1* | 12/2004 | Yamagami | 711/159 |
| 2006/0031647 A1* | 2/2006 | Hirakawa et al. | 711/162 |
| 2007/0277012 A1* | 11/2007 | Hara et al. | 711/162 |
| 2008/0010422 A1* | 1/2008 | Suzuki et al. | 711/162 |

* cited by examiner

*Primary Examiner*—Christian P Chace
*Assistant Examiner*—Ryan Bertram
(74) *Attorney, Agent, or Firm*—Sughrue Mion, PLLC

(57) ABSTRACT

One or more random access-type storage devices comprise a volume group and a journal volume. The volume group contains a volume pair configured from a primary volume and a secondary volume. Whenever data is received from a host device, this received data is written in the primary volume, a journal containing the write sequence of the data and the data is produced, and the journal is written in a journal volume. A plurality of journals accumulated in a journal volume are written in a sequential access-type storage device. Based on the write sequence recorded in each of the plurality of journals recorded in the sequential access-type storage device, the data of the journals is restored to the primary volume for storing the data and to a secondary volume from which the volume pair is configured.

24 Claims, 12 Drawing Sheets

FIG. 6

| CTG-ID | ONLINE LUN | DUPLICATED LUN | PRIORITY | TAPE GROUP | JOURNAL POOL |
|---|---|---|---|---|---|
| 0 | 0 | 2 | 2 | 0 | 10,11,12 |
|   | 1 | 3 |   |   |   |
| 1 | 4 | 5 | B | 1 | 13,14 |
| 2 | 6 | 7 | 3 | 2 | 15 |
| ⋮ | ⋮ | ⋮ | ⋮ | ⋮ | ⋮ |

| # | PRIORITY | COPY THRESHOLD | | SWITCHOVER THRESHOLD | |
|---|---|---|---|---|---|
|   |   | DATA QUANTITY | CP NUMBER | DATA QUANTITY | CP NUMBER |
| 1 | 1 | 0 | — | 0 | — |
| 2 | 2 | 100 | — | 100 | — |
| 3 | 3 | 200 | — | 100 | — |
| 4 | 4 | 200 | — | 200 | — |
| ⋮ | ⋮ | ⋮ | ⋮ | ⋮ | ⋮ |
| 10 | A | — | 0 | — | 0 |
| 11 | B | — | 10 | — | 5 |
| ⋮ | ⋮ | ⋮ | ⋮ | ⋮ | ⋮ |
| 21 | Custom1 | 300 | 10 | 100 | 10 |
| ⋮ | ⋮ | ⋮ | ⋮ | ⋮ | ⋮ |

1183 TAPE MANAGEMENT TABLE

| TAPE DRIVE NO. | USED TAPE GROUP |
|---|---|
| 0 | 2 |
| 1 | — |
| 2 | 3 |
| ... | ... |

FIG. 10

EXAMPLE JOURNAL CONFIGURATION

| CHECKPOINT ID | CTG NO. | STORING COMPLETION FLAG | SEQUENCE NO. | ADDRESS INFORMATION | DATA LENGTH | TARGET DATA |
|---|---|---|---|---|---|---|
| 119a | 119b | 119c | 119d | 119e | 119f | 119g |

| JOURNAL POOL ID | LUN |
|---|---|
| 10 | 1000,1001,1002 |
| 11 | 1003,1004,1005 |
| ⋮ | ⋮ |

5152 JOURNAL POOL MANAGEMENT TABLE

FIG. 16

| TAPE GROUP ID | TAPE ID |
|---|---|
| 0 | 000,001,002 |
| 1 | 003,004,005 |
| ⋮ | ⋮ |

2152 TAPE GROUP MANAGEMENT TABLE

| RESTORE POINT LUN | RESTORE FINISH POINT |
|---|---|
| 2 | 2:098 |
| 3 | 5:501 |
| ⋮ | ⋮ |

3152 RESTORE MANAGEMENT TABLE

| CTG-ID | DLCM IMPORTANCE |
|---|---|
| 1 | 3 |
| 2 | 1 |
| ⋮ | ⋮ |

4152 DLCM MANAGEMENT TABLE

STORAGE SUBSYSTEM AND BACK-UP/RECOVERY METHOD

CROSS-REFERENCE TO PRIOR APPLICATION

This application relates to and claims the benefit of priority from Japanese Patent Application No. 2006-241085 filed on Sep. 6, 2006, the entire disclosure of which is incorporated herein by reference.

BACKGROUND

The present invention relates to techniques for data backup and recovery.

Known storage system backup/recovery methods include a method referred to as CDP (Continuous Data Protection). In this method, data history is accumulated as a series of journals and, when recovery becomes necessary as a result of malfunction or operation failure, the accumulated journals can be employed to perform restore operation resulting in a data image of any point in time.

For example, cited reference 1 (Japanese Unexamined Patent Application No. 2004-252686) discloses a system that actualizes CDP. When data update from a host is performed, a storage system acquires update data and pre-update data to a journal volume of a disk and, furthermore, creates an association between a data set and an identifier. When restore is performed, the identifier associated with the data is employed to facilitate restore to a specified point in time. As the result, restore that does not substantially load the resources of the host can be performed.

There has been a dramatic increase in the use of electronic data that must be kept for a long period and, of the forensic-related data thereof, very complete journal data must be recorded. A problem inherent to conventional disk-based CDP is the excessive capacity and related cost created by the continuous acquisition of complete journal data to disks. Furthermore, because the disk capacity is limited, when an overflow of acquired data occurs, previous journal data must be deleted. Accordingly, there is a problem whereby only short-period segments of data can be kept.

A method based on the storing of journal data in a tape by a host has also been developed. However, this method suffers from a drawback in that a large load is placed on the host that leads to a lowering of host performance. In addition, this method gives no consideration at all to restore efficiency from the tape. The application of this method is not restricted to tapes and it may be similarly implemented in other types of sequential access-type storage device (storage devices of a type in which high-speed sequential access processing is possible but high-speed random access processing is not possible).

SUMMARY

Accordingly, an aspect of the present invention provides for keeping journals at low cost.

An additional aspect of the present invention enables performing journal backup without load being placed on the host device.

A further aspect of the present invention enables journal backup that facilitates efficient restore.

Other aspects of the present invention should be apparent from the following description.

The storage system based on an embodiment of the present invention comprises at least one random storage device which constitutes a storage device of a type in which high-speed random access processing is possible, a plurality of sequential storage devices which constitute a storage device of a type in which, while high-speed sequential access processing is possible, high-speed random access processing is not possible, and further comprises a backup unit, and a restore unit.

The at least one random storage device comprises a volume group and a journal volume. The volume group contains a volume pair configured from a primary volume and a secondary volume. Whenever data sent from a host device is received, the storage system writes the received data in the primary volume, produces a journal entry containing the write sequence of the data written in the primary volume and the data, and write the journal in the journal volume.

The backup unit writes a plurality of journals accumulated in the journal volume as described herein into at least one of the plurality of sequential devices. The restore unit, based on the write sequence recorded in each of the plurality of journals recorded in at least one of the plurality of sequential devices, restores the data of the journals to the primary volume for storing this data, the secondary volume from which the volume pair is configured, or a volume related thereto. The volume related to the secondary volume referred to here constitutes, for example, a volume in which the data that has been restored to this volume is to be reflected in this secondary volume. When restore to the volume has been performed, the data of the volume may be copied to a secondary volume by way of one or a plurality of volumes or by pairing the volume as a primary volume with the secondary volume.

The storage system can be configured from one or a plurality of storage subsystems. That is to say, a primary volume and secondary volume may exist in a single storage subsystem, or they may exist in individual storage subsystems.

These elements can be implemented using hardware and computer programs or a combination thereof (for example, actualization of part thereof by a computer program with the remainder being actualized by hardware). The aforesaid computer program is read into a prescribed processor and executed. In addition, in information processing that involves a computer program being read into a processor and executed, storage regions such as a memory that exist in the hardware resource may be used as is appropriate. In addition, the computer program may be installed in a computer from a recording medium such as a CD-ROM, or it may be downloaded to a computer by way of a communications network.

BRIEF DESCRIPTION OF THE DRAWINGS

FIG. 6 is a diagram showing an exemplary CTG management table;

FIG. 7 is a diagram of an exemplary priority management table;

FIG. 9 is a diagram of an exemplary configuration of a tape management table;

FIG. 10 is a diagram of an exemplary configuration of a journal;

FIG. 15 is a diagram of an exemplary configuration of a journal pool management table;

FIG. 16 is a diagram of an exemplary configuration of a tape group management table;

DESCRIPTION OF THE PREFERRED EMBODIMENTS

Figure 1:
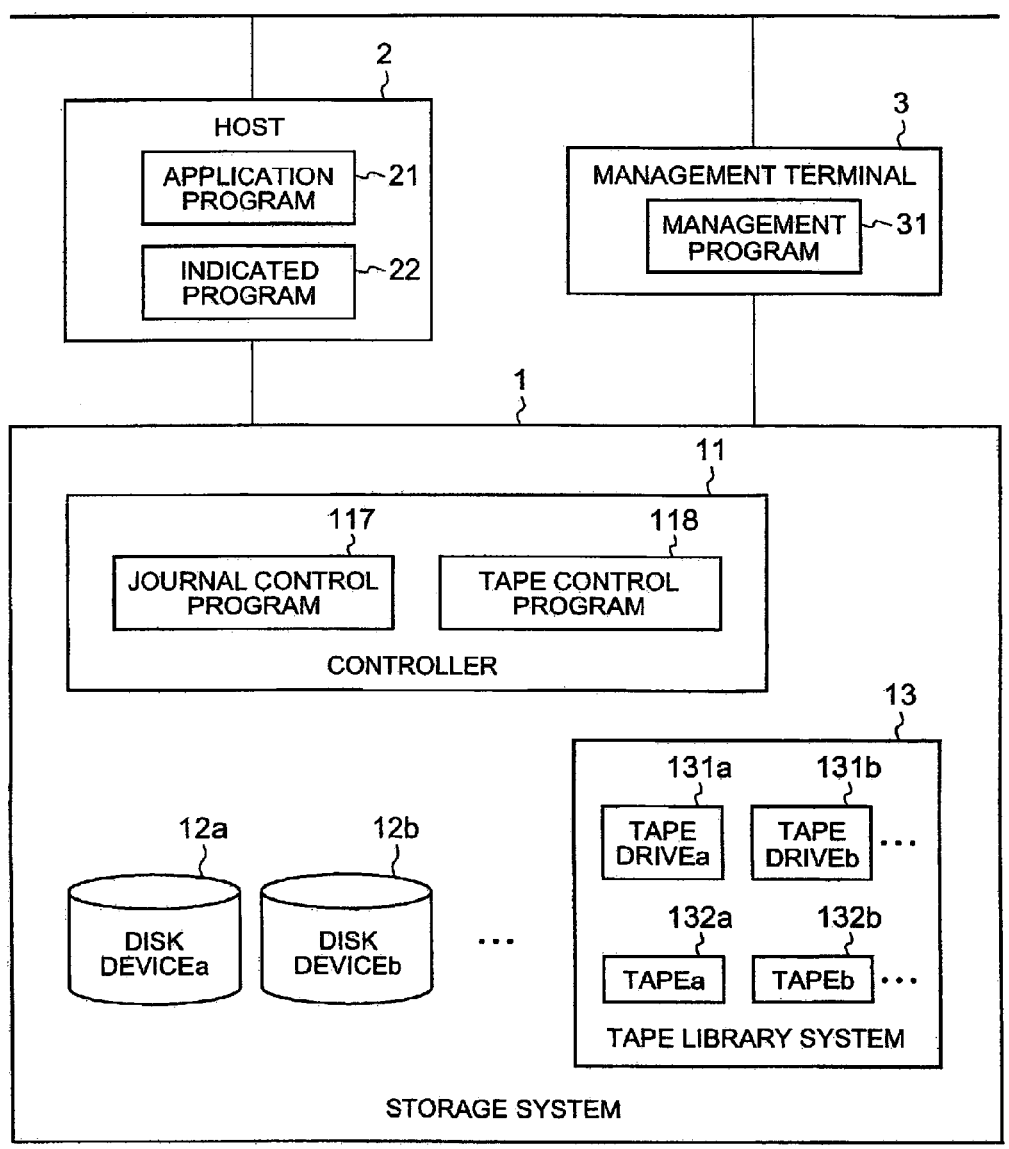
FIG. 1 is a diagram of an exemplary configuration of a computer system pertaining to a first embodiment of the present invention.

Several embodiments of the present invention will be hereinafter described with reference to the drawings. While in the following description the random device is taken to mean a disk device (for example, disk-type storage device such as a hard disk), other types of storage device such as a flash memory are possible. In addition, while the sequential device is taken to mean a tape (for example, magnetic tape medium), other types of storage device are possible.

Embodiment 1

A first embodiment of the present invention will be summarily described.

A storage subsystem comprises a controller, disk device and a tape library. The controller executes a journal control program for controlling journal acquisition, and a tape control program for controlling a tape. A journal pool configured from one or more journal volumes is prepared on the disk device. A journal volume refers to a logical volume in which journals are stored.

The journal control program acquires journal data and accumulates the journal data in a journal pool in response to a write access from a host device (for example, a host computer or other storage subsystem). Consistency groups and the priority thereof are set in advance. Consistency groups are configured from at least one volume pair, and these volume pairs comprise a primary volume and a secondary volume. The primary volume is a logical volume supplied to the host device for generating write access. The secondary volume is a logical volume that serves as a duplicate of the primary volume. A consistency group refers to a volume group for which consistency between one or more primary volumes and one or more secondary volumes is required. The consistency groups are prepared on the disk device.

The tape control program uses the consistency group unit to monitor the total quantity of one or more journal data not copied to the tape library (hereinafter this is also referred to simply as "tape quantity"). The tape control program controls copy from the journal pool to a tape in response to the priority of the consistency groups.

More specifically, as a first example thereof, in the case of a plurality of consistency groups using a single journal pool, the tape control program chooses primary volume journal data of the same consistency group from this journal pool and stores it in the same tape group. For restore to a secondary volume, it reads out a journal correspondent to the consistency group comprising this secondary volume from this same tape group and restores the data of this journal to the secondary volume.

In addition, as a second example thereof, for backup (copy) of a journal primary volume based on separating of the tape groups into consistency groups, the tape control program performs backup of the journal in the tape group correspondent to the consistency group comprising this primary volume. For restore to a secondary volume, it reads out the journal from the tape group correspondent to the consistency group comprising this secondary volume and restores the data of this journal to the secondary volume.

According to the first embodiment described above, because the journal data is kept using tapes which are of generally lower bit cost than a disk device, the journal data can be kept at low cost.

In addition, backup from the journal volume to the tape can be performed in a storage subsystem and, therefore, backup can be performed without load being placed on the host device.

Furthermore, efficient high-speed restore can be realized by performing tape housing in accordance with a restore unit. More specifically, based on the second example described above, a specific tape group is assigned to a single consistency group, and the journals stored in this tape group may all be taken to be journals containing data to be restored to the secondary volume of this consistency group. Accordingly, so long as the sequentially read data of the journal is sequentially restored to the secondary volume, restore can be performed without frequent forwarding of rewinding of the tape.

A first embodiment of the present invention will be hereinafter described in detail. Notably, identical parent numbers (for example, 12 to the disk device) have been assigned to the constituent elements of the same type, and constituent elements of the same type are differentiated in the description using a combination of a parent number and a dependant symbol (for example 12a, 12b).

FIG. 1 is a diagram of an example configuration of a computer system pertaining to a first example of the present invention.

The symbol 1 denotes a storage subsystem of which 11 denotes a controller for controlling the storage subsystem 1, 12a, 12b denote disk devices for storing of data from a host 2, and 13 denotes a tape library system. The tape library system 13 comprises tape drives 131a, 131b that perform access to tapes 132a, 132b ... and the tapes 132a, 132b ... for the actual storing of data. The number of tape drives is significantly smaller than the number of tapes. The controller 11 comprises a journal control program 117 for controlling journal acquisition and a tape control program 118 for controlling to the tapes.

The symbol 2 denotes a host computer (hereinafter host) for accessing the storage subsystem 1, 21 denotes an application program actuated by the host, and 22 denotes an indication program for indicating checkpoint acquisition and so on to the storage subsystem 1. A plurality of hosts 2 may be connected. The programs 21, 22 are executed by a CPU of the host 2.

The symbol 3 denotes a management terminal for managing the storage subsystem 1, 31 denotes a management program for managing the storage subsystem 1 actuated by the management terminal 3. The host 2 can serve additionally as a management terminal with the management program 31 being actuated by the host 2. In addition, the indication program 22 may be arranged in the management terminal 3, and indication to the storage subsystem 1 based on "Out-of-band" management is also possible.

Figure 2:
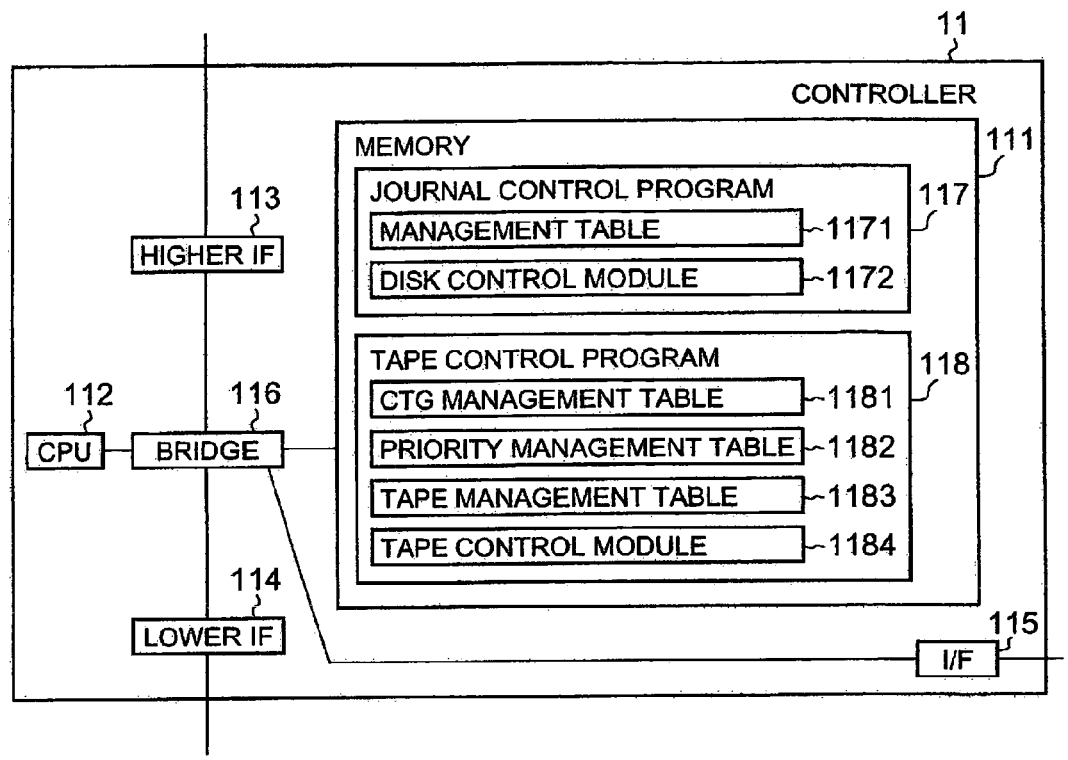
FIG. 2 is a diagram of an exemplary configuration of a controller of a storage subsystem 1.

FIG. 2 is a diagram of an example configuration of the controller 11.

The controller 11 comprises a memory 111, CPU 112, upper IF 113, lower IF 114, IF 115 and bridge 116. IF is a short for "Interface".

A range of information necessary for controlling the storage subsystem 1 such as control programs for performing control of the storage subsystem 1, control information and management information are stored in the memory 111. In addition, the memory is also used as a cache memory for temporarily storing data from a host in order to increase access speed. The journal control program 117 comprises a management table 1171 in which disk configuration information or management information is listed, or a disk control module 1172 for performing IO processing of the disk or disk management. The tape control program 118 comprises a CTG management table 1181 for managing the consistency group which serves as the unit for performing simultaneous restore, a priority management table 1182 for managing the storage priority to the tapes, a tape management table 1183 for managing the usage conditions of the tapes, and a tape control module 1184 for performing the IO processing of the tapes or tape management.

The CPU 112 executes the various control programs and performs control of the storage subsystem 1. The upper IF 113 performs input/output control between the host 2 and the controller 11, and the lower IF 114 performs input/output control between the controller 11 and the disk device 12.

The tape library system 13 has connection with either the upper IF 113 or lower IF 114 and, when it has connection with the upper IF 113, the upper IF 113 performs input/output control between the controller 11 and the tape library system 13. When it has connection with the lower IF 114, the lower IF 114 performs input/output control between the controller 11 and the tape library system 13. For the connection between the host 2 and the disk device 12, various IF including a Fiber Channel, SCSI (Small Computer System Interface), iSCSI (Internet Small Computer System Interface), Infiniband, SATA (Serial ATA), SAS (Serial Attached SCSI) and so on can have application. The host 2 side is sometimes referred to as the "front end" and the disk device 12 side is sometimes referred to as the "back end". In this embodiment, while for reasons of simplicity one of each of the upper IF 113 and lower IF 114 may be used, either may be provided in plurality.

The IF 115 constitutes an IF separately provided to the input/output of the data from the host 2 and is employed as a management port of the storage subsystem 1. A range of IF can have application in the IF 115 with a LAN connection, which is widely used in network apparatuses in particular, representing a suitable example thereof. The bridge 116 controls various types of data transfer such as the data transfer between the CPU 112 and memory 111 and between the upper IF 113 and the memory 111. For reasons of load dispersal (load balance) or failover, the controller 11 may provided in plurality in the storage subsystem 1.

Logical volume will be described hereinafter.

Figure 3:
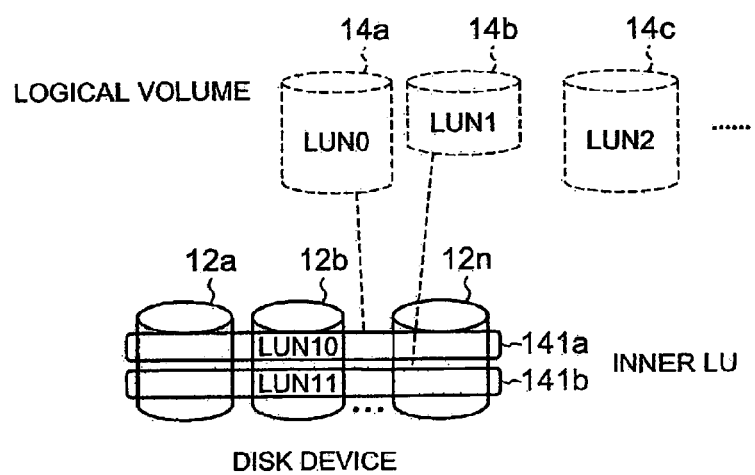
FIG. 3 is a diagram of an example of the assigning of a logical volume.

FIG. 3 is a type diagram of the assigning of logical volume.

The disk region is normally recognized from the host by means of a logical volume unit (LU: Logical Unit). The storage subsystem 1 is able to virtually define and construct the volume that is to be used from the host 2. This logical volume is called a virtual LUN. In contrast, the volume that expresses the physical storing point within the device is referred to as an inner LUN.

The symbol 14 in FIG. 3 denotes a virtual LUN, and 141a, 141b denote inner LUN. A RAID group is formed from a plurality of disk devices 12, and a plurality of inner LUN can be defined in a single RAID group. When there is need for a region for the actual storing of data, the virtual LUN is mapped as the inner LUN that expresses the physical storage point in the device. A plurality of inner LUN can be integrated and mapped as a single virtual disk LUN. If the data housing point is altered by data migration or the like, access to target data is possible by switchover of the mapping between a virtual LUN and an inner LUN. In addition, when there are no volumes being used, there is no need for an inner LUN to be assigned. The correspondence relationship between the virtual LUN and inner LUN can be freely established.

Figure 4:
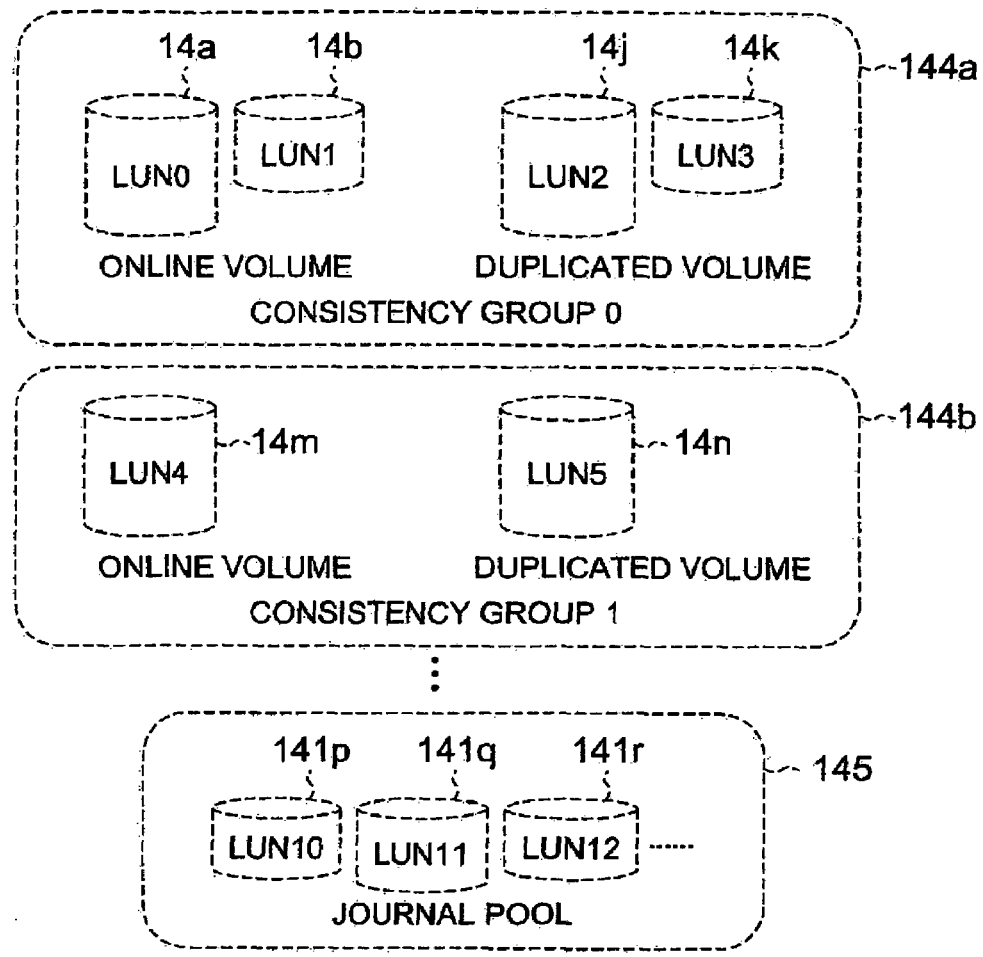
FIG. 4 is a diagram of an exemplary logical volume configuration.

FIG. 4 is a diagram of an example configuration of a logical volume.

The symbol 144 denotes a consistency group that serves as the unit for simultaneous restore, and 145 denotes a journal group that constitutes the region for storing of journal data.

One or a plurality of consistency groups 144 can be set by the storage subsystem 1, a plurality of volumes 14 being contained in the consistency groups. Sometimes, for example, when a plurality of volumes are being used by the application program 21, that this is pointless unless the volumes all possess the data of a particular specific identical point in time. Because this case necessitates that a batch-restore be performed on all volumes used by the application program 21, these volumes must be set in the same consistency group.

In this embodiment, the volume normally used by a host is called an online volume (it may also be called the primary volume) and the volume for storing duplicated data of the online volume at a particular point in time is called a duplicated volume (it may also be called a secondary volume). The consistency group 144 contains an online volume and a duplicated volume. The content of an online volume may be reflected in a duplicated volume in response to a checkpoint indication from a host. The duplicated volume is managed by association with a checkpoint ID to ascertain what the content of the housed data is at the point in time of the checkpoint The journal pool 145 can contain one or a plurality of inner volumes 141. The storage subsystem 1 may use a single journal pool 145 or it may assign a journal pool corresponding to each consistency group.

The tape group will be hereinafter described. The storage subsystem 1 comprises the tape library system 13 described above for the purpose of storing a large quantity of data. A plurality of tapes 132 exist in the tape library system 13, and these plurality of tapes are divided into groups referred to as tape groups.

Figure 5:
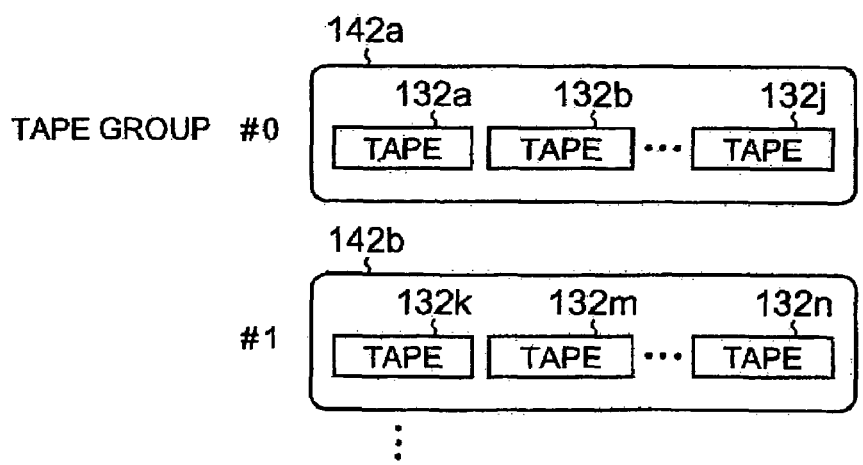
FIG. 5 shows an example of the assigning of a tape group.

FIG. 5 is a diagram of an example of a tape group.

The symbol 142 denotes a tape group. One or a plurality of tapes 132 are contained in the tape group 142. A tape group may be produced by a user in advance by way of the management program 31 and, in accordance with need, the storage subsystem 1 may automatically assign a blank tape to the tape group.

FIG. 6 is an example of a CTG management table. CTG is an acronym for a consistency group.

The CTG management table 1181 constitutes a table for managing the assigning of disks or tapes belonging to a consistency group. The table lists a CTG-ID 1181a that constitutes the ID for identifying the consistency group, and LUN (more specifically, online volume LUN 1181b, and duplicated volume LUN 1181f for forming a pair therewith) of the disks belonging to the consistency group. In addition, the table lists priority 1181c of storing to a tape, an identifier 1181d of the tape group assigned to the consistency group, and an identifier 1181e of a corresponding journal pool. When a single journal pool is used by the system, identical values are set for all identifiers 1181e of the journal pool. Moreover, what journal volume belongs to what journal pool is managed by, for example, a journal pool management table (may be information of another format type) 5152 shown in FIG. 15. This table 5152 may be supported by the journal control program 117 as all or part of the management table 1171 or as a separate entity.

FIG. 7 is a diagram of one example of a priority management table.

A priority management table 1182 constitutes a table for managing what kind of criterion value the priority possesses. This embodiment, in one example thereof, has a copy threshold value 1182b and a switchover threshold value 1182c. The copy threshold value 1182b is a threshold value for judging whether or not copy (copy from a journal volume to a tape) is to be started. The switchover threshold value 1182c constitutes a threshold value for, when the tape of a tape group in question is unable to use a tape drive for a reason such as it is being used by the tape of another tape group, judging whether or not the copy is started based on the interruption of the use of the tape of the other tape group, and the object tape being loaded into a tape drive and the tapes being switched over.

Data quantity, checkpoint number, or both data quantity and checkpoint number can be employed as the appraisal criteria of the threshold values of each of the copy threshold value 1182b and switchover threshold value 1182c. The "data quantity" refers to the total data quantity of one or more journals of the plurality of journals of the corresponding consistency groups that have not been copied from a journal volume to a tape. The "checkpoint number" denotes the number of checkpoints of the plurality of checkpoints of the corresponding consistency groups that have not been reflected from a journal volume to the tape. The term "reflection" rather than copied is used here because the checkpoint itself may be copied and, replacing this copy itself, a later-described tape mark (for example, file mark) may be recorded in the tape.

An example of a method for setting priority will be described.

Figure 8:
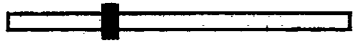
FIG. 8 is a diagram of an exemplary management screen.

FIG. 8 is a diagram of one example of a management screen of the management program 31.

The user can operate the management program 31 to set a priority for each consistency group. To put this another way, the management program 31 displays a management screen 311 (a type of GUI), and the selection of a plurality of data quantity in accordance with priority prepared in advance and a plurality of CP (checkpoint) numbers is received by way of the management screen 311. Otherwise, a custom setting in which the user sets the desired data quantity and/or CP number as threshold values can be received by way of the management screen 311.

The priority can be selected using either one or both the data quantity and the checkpoint number as the criteria. If the checkpoint number is selected, A has the highest priority with the priority reducing in the order B, C, D. If data quantity is employed as the appraisal criteria for priority, 1 represents the highest priority with the priority reducing in the order 2, 3, 4. The data quantity and checkpoint number criteria can be automatically determined in response to the selected priority.

In contrast, when a user wishes to set the data quantity and checkpoint number in more detail, a custom setting can also be selected. Priority-ID that serves as ID for identifying priority can be input and selected in subsequent settings. Custom setting involves the selection of the data quantity or checkpoint number, or both the data quantity an checkpoint number. The user can input the copy threshold and the switchover threshold respectively.

The management program 31 sends the input value (data quantity and/or CP number) to the storage subsystem 1, and the tape control program 118 reflects the input value thereof to the priority management table 1182 and CTG management table 1181.

FIG. 9 is a diagram of one example of a tape management table.

The tape drive number and the in-use tape drive number for each tape drive 131 are listed n the tape management table 1183. The non-used tape drives are listed using a symbol indicating it is "blank". As a result, which tape of the tape group of the tape drive is being used and which tape drive is not being used can be judged.

FIG. 10 is a diagram of an example configuration of a journal.

A journal contains a checkpoint ID 119a used by the host 2 and the storage subsystem 1 to uniquely identify a checkpoint, a CTG number 119b that identifies consistency groups, and a completion flag 119c that expresses whether or not storage to the tape has been completed. In addition, the journal contains a sequence number 119d that indicates the acquisition sequence of the journals, address information 119e that indicates the LUN of the logical volume and the address thereof, data length 119f of the target data, and target data 119g.

The CTG number 119b can be determined from the address information 119d and CTG management table 1181. The CTG number 119b is used for increasing search speed in the later-described tape storing processing and is unnecessary when a journal pool has been set for each consistency group.

The completion flag 119c is ON when the journals have been copied to a tape. In other words, it is set to a value that signifies storing completion.

The address information 119e serves as information that expresses the position in which the target data 119g contained in the journals is written. More specifically, for example, of these journals are journals of the target data (write target data) 119g to be written in a particular online volume, the address information 119e contained in the journals constitutes the LUN of the particular online volume described above which serves as the write point of the target data 119g, and the LBA (logical block address) thereof.

Journal acquisition processing will be hereinafter described.

Figure 11:
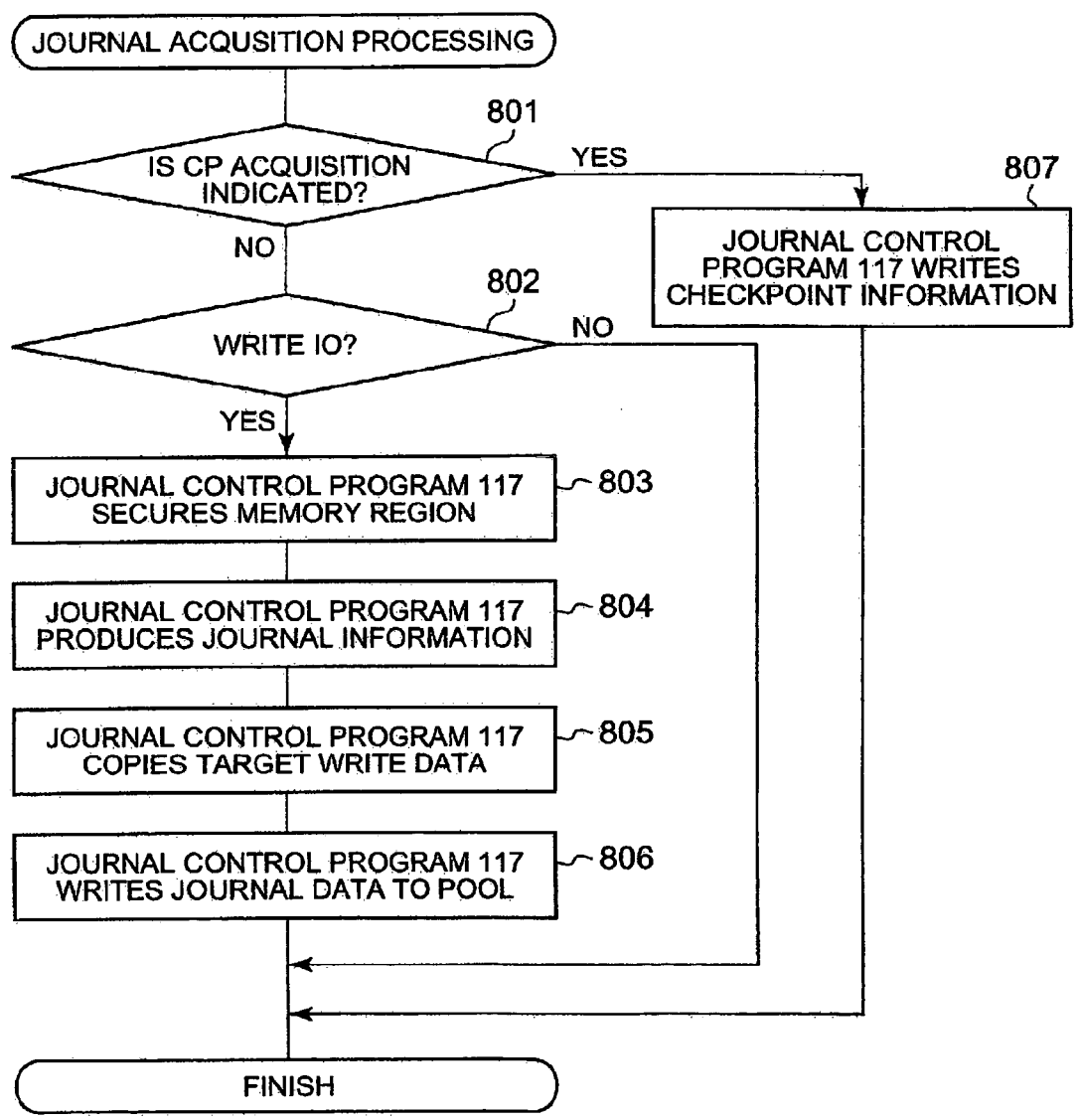
FIG. 11 is a flow chart of an example of journal acquisition processing.

FIG. 11 is a flow chart of one example of journal acquisition processing.

The journal control program 117 judges whether or not a command received from the host 2 is a checkpoint acquisition indication (Step 801). Checkpoint acquisition is indicated by the application program 21 or by the user and is used as an indicator during restore. When indication is provided by the application program, the target consistency group number and checkpoint ID are sent to the storage subsystem 1 by way of an indication program 22. When indication is provided by the user, the target consistency group number and checkpoint ID are sent to the storage subsystem 1 by way of the management program 31. When the received command is a checkpoint acquisition indication (YES in Step 801), the processing proceeds to Step 807, and when it is not a checkpoint acquisition indication (NO in Step 801), the processing proceeds to Step 802.

When a checkpoint acquisition indication is received, the journal control program 117 writes the checkpoint information in a journal pool (Step 807). More specifically, for example, the journal control program 117 stores a journal containing a checkpoint ID, a target CTG number, and a sequence number. When the journal pool is separated into each of its consistency groups, the journal control program 117 refers to the CTG management table 1181 and specifies the journal pool correspondent to the target CTG number and writes it in the journal volume of this journal pool. The journal volumes belonging to this journal pool can be specified by referring to the table 5152 illustrated in FIG. 15. Moreover, statuses including a non-use status or full status may also be listed in the table 5152.

When the received command is not a checkpoint acquisition indication, the journal control program 117 judges whether or not the received command is a write IO (Step 802) and, if the received command is not a write IO (NO in Step 802), the processing is finished.

When the received command is write IO (YES in step 802), the journal control program 117 secures a cache memory region for storing journal data (Step 803). This cache memory region is secured from the memory 111.

Next, the journal control program 117 produces journal data in the secured cache memory region. More specifically, it houses the CTG number, sequence number, address information and data length (Step 804).

Next, the journal control program 117 copies the target write data to the secured cache memory region (Step 805). In other words, target write data (target data) is contained in the abovementioned journal.

Next, the journal control program 117 writes the produced journal data in a journal pool (Step 806). When the journal pool has been divided into each of its consistency groups, it refers to the CTG management table 1181 and writes the data in the correspondent journal pool.

This processing is performed to the extent that updates to online volume of the consistency group occur (that is to say, the extent to which new data is written). As a result, journal data accumulates in the journal pool.

Tape storing processing will be hereinafter described. The tape control program 118 performs a threshold value processing of the journal data stored in a journal pool by regularly repeating the tape storing processing.

Figure 12:
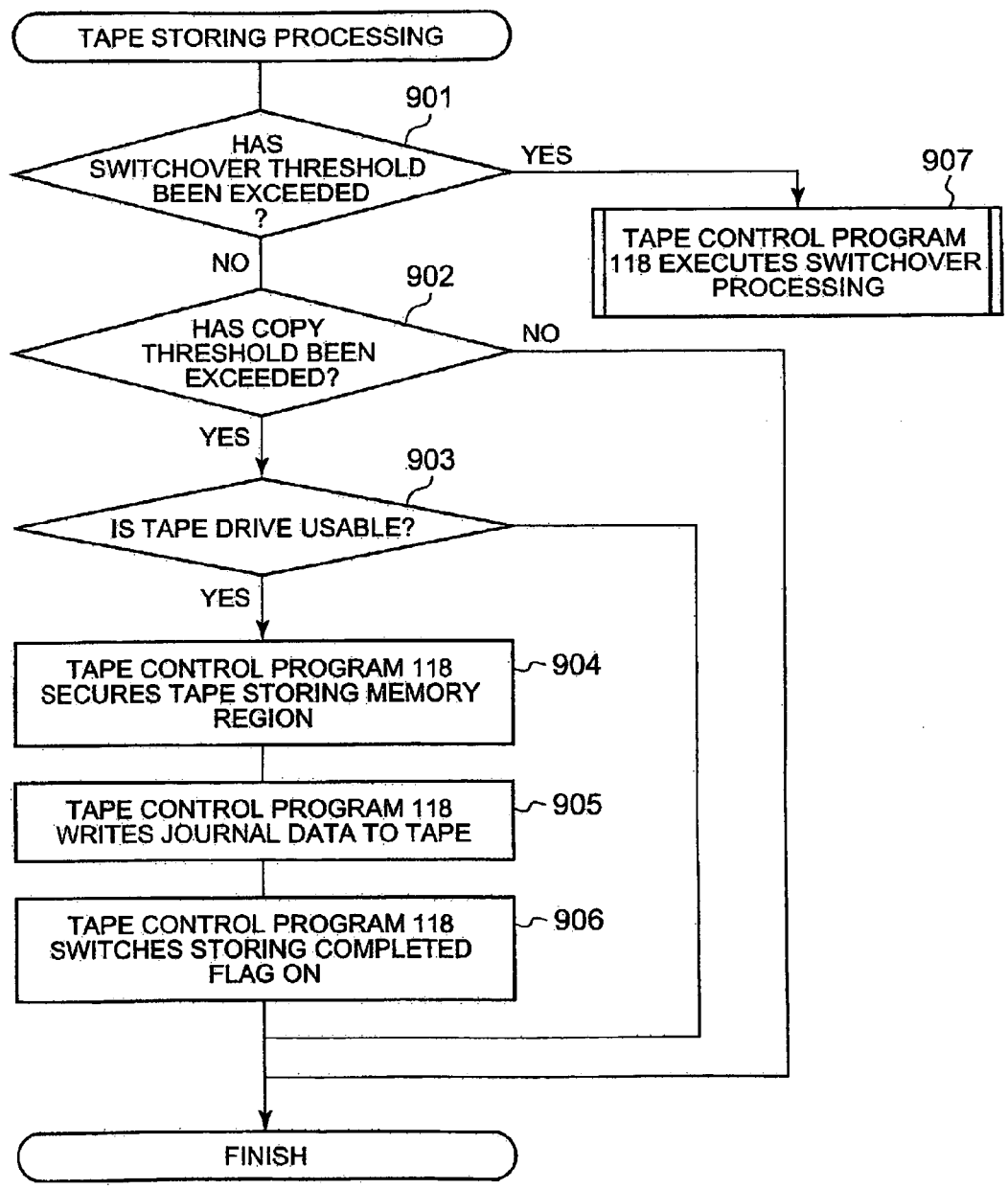
FIG. 12 is a flow chart of an example of tape storing processing.

FIG. 12 is a diagram of one example of tape storing processing.

The tape control program 118 judges, for each target consistency group, whether or not the journal data stored in a journal pool has exceeded a switchover threshold value or not (Step 901). When the switchover threshold value is exceeded (YES in Step 901), the processing shifts to Step 907 and switchover processing is performed. On the other hand, when the switchover threshold value is not exceeded (NO in Step 901), the processing shifts to Step 902. Moreover, the judgment of whether or not the switchover threshold value has been exceeded can be made by, for example, specifying the switchover threshold value correspondent to the priority that is correspondent to the target consistency group, and specifying the data quantity and/or CP number of the journal correspondent to the targeted consistency group from the journal pool and comparing the data quantity and/or CP number with the data quantity and/or CP number serving as the specified switchover threshold value.

Next, the tape control program 118 judges whether or not the journal data of the target consistency group has exceeded the copy threshold value (Step 902). When the copy threshold value is exceeded (YES in Step 902) the processing shifts to Step 903, and when the copy threshold value is not exceeded (NO in step 902) the processing is finished. Moreover, the judgment of whether or not the copy threshold value is exceeded can be made by, for example, specifying the copy threshold value correspondent to the priority that is correspondent to the targeted consistency group, and specifying the data quantity and/or CP number of the journal correspondent to the targeted consistency group from the journal pool and comparing the data quantity and/or CP number with the data quantity and/or CP number serving as the specified copy threshold value.

In Step 903 the tape control program 118 judges whether or not a tape drive is usable. This is facilitated by reference to the tape management table 1183. When all tape drives are being used by the tapes of other tape groups they are unusable (NO in Step 903). A tape drive is usable when the object tape is already loaded in the tape drive or when a blank tape drive exists (YES in Step 903). In this case, the object tape is loaded in the blank tape drive.

When YES in Step 903, the tape control program 118 secures a cache memory region of a size necessary to read the journal data (Step 904). Thereupon, for example, a cache memory region of a capacity not less than that of the total data quantity of journals where the completion flag is OFF can be secured.

Next, the tape control program 118 reads the journal data of the target consistency group (consistency group in which the copy threshold value is exceeded) from the journal pool to the cache memory region and writes it to a tape (Step 905). At this time, when the write target is checkpoint information, replacing the checkpoint information or in addition to the checkpoint information, a tape mark (for example, a file mark or a set mark) indicator which constitutes an indicator for increasing the speed of data search during restore is written. The tape mark can be written using a command of a type different to the write command issued when a journal is written to a tape. When the blank tape capacity is used up during the course of writing to a tape, the writing can be continued by switchover to a tape of the same tape group. In addition, switchover of the tape may be performed at each fixed checkpoint. Moreover, what tape belongs to what tape group can be judged by, for example, referring to the tape group management table 2152 illustrated in FIG. 16. This table 2152 may be supported by the tape control program 118.

Next, the tape control program 118 switches the completion flag of the target journal data of the journal pool to ON (Step 906). The journal control program can regularly (or at the moment of notification of the finish of tape storing processing from the tape control program) refer to the journal pool, delete the completion flag ON journal data, and release the disk region.

Next, switchover processing will be described. When the tape drive number is larger than the tape group number, the switchover processing is unnecessary because the assigning of one or more tape drives to the tape groups can be guaranteed. However, in this embodiment, switchover of the tape group used in the tape drive is necessary because the tape group number is greater than the tape drive number.

Figure 13:
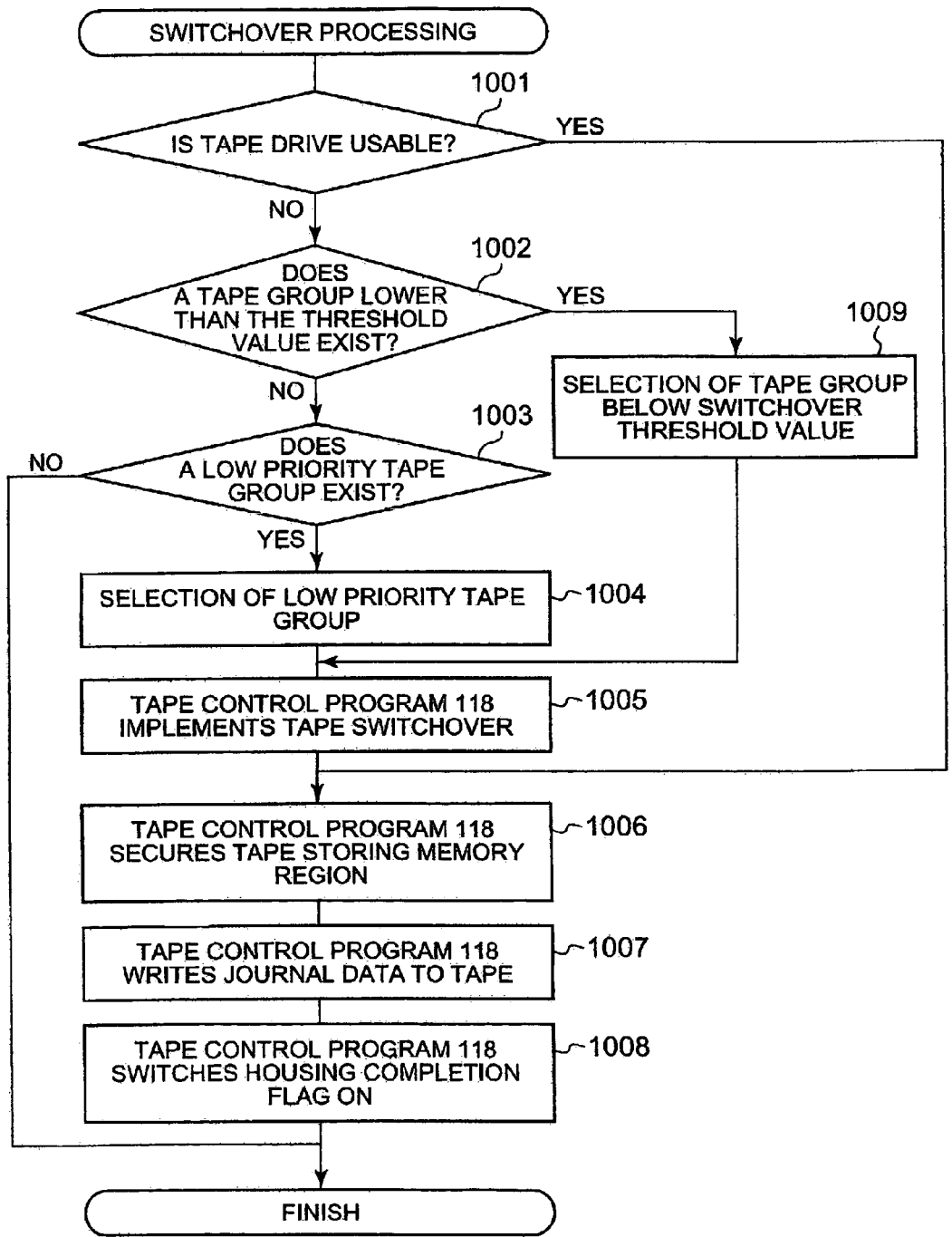
FIG. 13 is a flow chart of an example of switchover processing.

FIG. 13 is a diagram of one example of switchover processing.

The tape control program 118 judges whether or not a tape drive is usable without switchover being performed (Step 1001). This is facilitated by reference to the tape management table 1183. A tape drive is usable when the object tape is already loaded in the tape drive or a blank tape drive exists (YES in Step 1001). In this case, the object tape is loaded in the blank tape drive and the processing proceeds to Step 1006. On the other hand, when all the tape drives are being used by the tapes of other tape groups (NO in step 1001), the processing moves to Step 1002.

In Step 1002 the tape control program 118 judges whether or not a tape group of not more than the switchover threshold value exists in the tape group currently being used (Step

1002). It performs this judgment by, for example, specifying the tape groups correspondent to the tape drives from the tape management table 1183, specifying the consistency groups correspondent to the specified tape groups from the CTG management table 1181 and, for the specified consistency groups, comparing the data quantity and/or CP value specified from the switchover threshold value with the specified data quantity and/or CP value described above. When this tape group exists the processing moves to Step 1009. When this tape group does not exist the processing moves to Step 1003.

When a tape group not more than the switchover threshold value exists (YES in Step 1002), the tape control program 118 selects this tape group as a switchover candidate (Step 1009). If a plurality of tape groups not more than the switchover threshold value exist, the tape group in which the data quantity and/or CP value accumulated in the journal pool is furthest from (the smallest) the switchover threshold value can be selected.

When no tape groups not more than the switchover threshold value exist (NO in Step 1002), the tape control program 118 judges whether or not tape groups of lower priority than the target tape group (consistency group for which the judgment is NO in Step 1002) exist in the tape groups currently being used (Step 1003). When a tape group of low priority does not exist the processing is finished.

When a tape group of low priory does exist (YES in Step 1003), the tape control program 118 selects this tape group as a switchover candidate (Step 1004). When a plurality of tape groups of low priority exist, the tape group of lowest priority can be selected. When a plurality of tape groups of the same priority exist, the tape group of data quantity or CP number accumulated in the journal pool furthest from (the smallest) the threshold value can be selected.

Next, the tape control program 118 performs switchover between the tape of the selected tape group and the tape of the target tape group (Step 1005). More specifically, the use of the tape of the selected tape group is interrupted, the tape is unloaded, the tape is shifted from the tape drive to its original slot and, in its place, the tape of the target tape group is loaded to the tape drive. The tape management table 1183 is rewritten at this time.

Subsequently, an identical processing to that of Steps 904 to 906 described above is implemented (Step 1006 to 1008).

Switchover of the used tape group can be performed in the manner described above.

Restore processing will be hereinafter described. Restore processing is indicated by the application program 21 or the user. When the restore processing indication is provided by the application program 21, for example, the target consistency group number and the checkpoint ID being restored (restore CP-ID) are sent to the storage subsystem 1 by way of the indication program 22. When the restore processing indication is provided by the user, the target consistency group number and the checkpoint ID being restored (restore CP-ID) are sent to the storage subsystem 1 by way of the management program 31. The restore point LUN may be indicated when there is a wish to alter the restore point.

Figure 14:
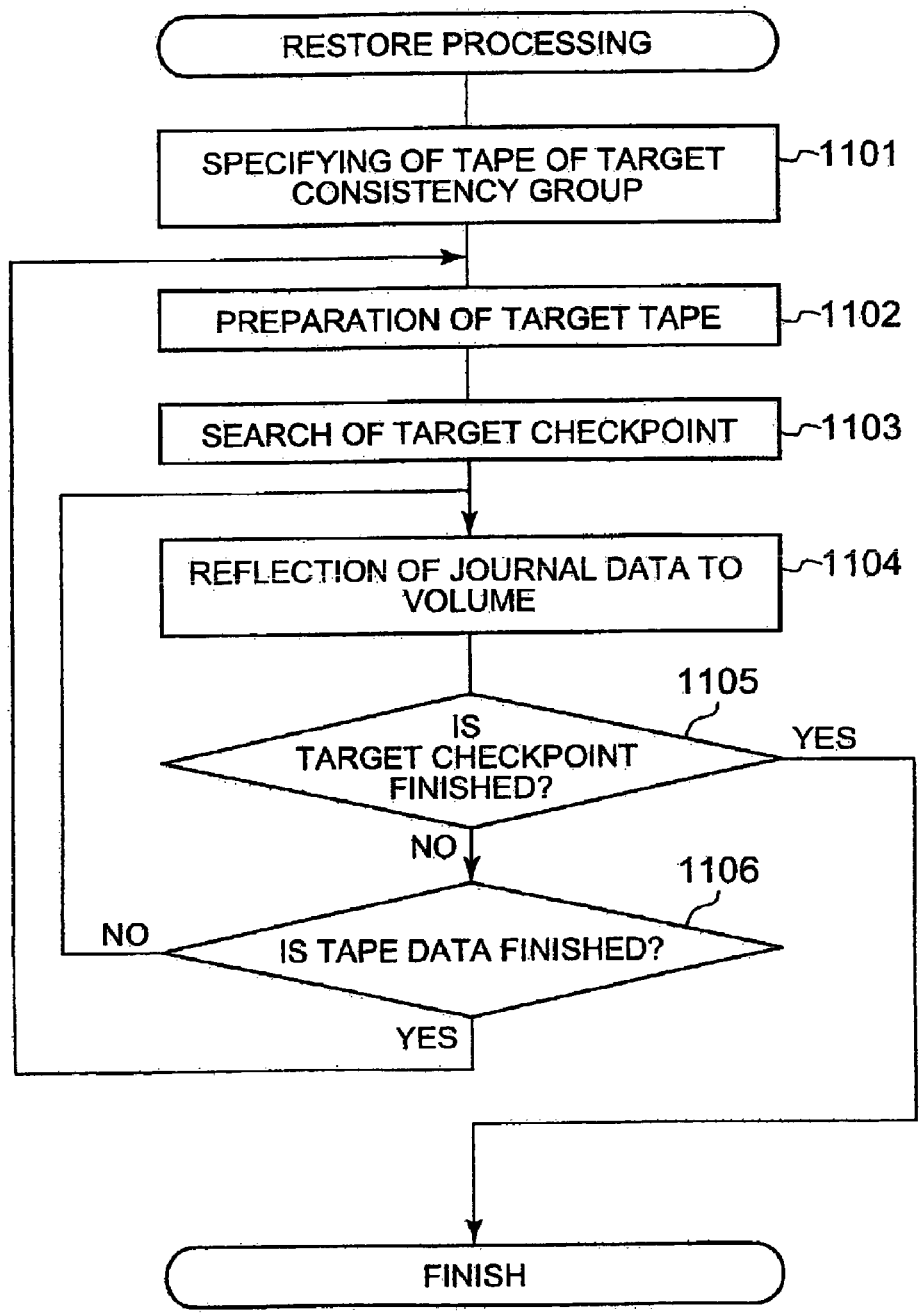
FIG. 14 is a flow chart of an example of restore processing.

FIG. 14 is a diagram of one example of restore processing.

When restore indication is received, the tape control program 118 specifies the tape of the correspondent tape group from the indicated consistency group number and current checkpoint ID of the restore point volume (Step 1101).

Next, the tape control program 118 prepares a target tape (specified tape) in a tape drive (Step 1102). When all tape drives are being used, a selection and switchover to the tape group of lowest priority of the tape groups being used may be performed.

Next, the tape control program 118 searches the tape for the checkpoint ID (Step 1103). In this embodiment, the tape mark is recorded in the tape in the position of the checkpoint and, accordingly, the search involves a search for the tape mark. When there is no checkpoint ID the same as the checkpoint ID of the restore point volume found, an error is returned.

Figures 17, 18, 19:
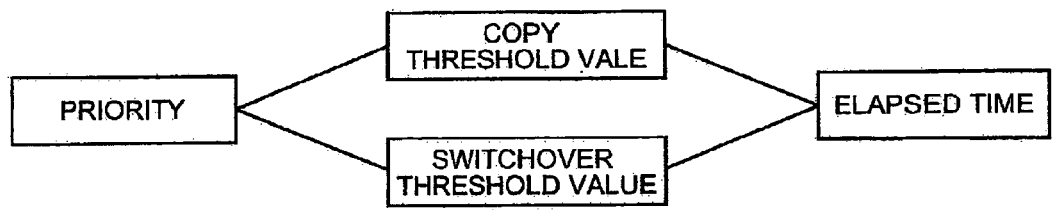
FIG. 17 is a diagram of an exemplary configuration of a restore management table.
FIG. 18 is an explanatory diagram of a copy threshold value and a value compared therewith of a second embodiment of the present invention.
FIG. 19 is an example of a DLCM management table.

When a checkpoint ID the same as the checkpoint ID of the restore point volume is found, the tape control program 118 reads the journal data from the tape and reflects the data of this journal data to the restore point volume (Step 1104). Moreover, as illustrated in FIG. 17, a restore management table 3152 lists, for each restore point volume LUN, a restore finish point that expresses to what extent restore has been performed. Example restore finish points include the ID of the finally reflected CP (checkpoint ID), the sequence number of the finally restored journal, or a combination thereof. Restore involves the data control program 118 reading a journal with a sequence number between the restore finish point and a designated checkpoint ID and restore the data of this journal to the restore point volume.

The tape control program 118 processing is finished when the reflection of the journal data to the designated restore CP-ID is finished (YES in Step 1105). When the restore CP-ID is not finished (NO in Step 1105), the processing moves to Step 1106.

In Step 1106, the tape control program 118 judges whether or not the tape data of the target tape is finished or not. When the tape data is finished (YES in Step 1106), the processing moves to Step 1102 and switchover to the next tape (for example, for the tape ID, to the next ID tape) is performed, and when tape data still remains (NO in Step 1106), the processing returns to Step 1104 and the processing for reflecting the journal data continues. Moreover, when a plurality of tape drives can be used, the plurality of data may be read simultaneously and in parallel from each of the tape drives.

During the restore described above, because the data that exists in a single tape is that of a single consistency group only, the required data only can be continuously read out a high speed.

Based on this, the storage subsystem 1 can acquire long-term journal data at low cost by shifting the journal data to tapes of low bit cost. In addition, high-speed storage in the storage subsystem is made possible without load being placed on the host by the shift processing of the journals. Furthermore, efficient high-speed restore is made possible by tape storing performed in accordance with consistency groups that serve as a restore unit.

The writing of journals to a tape in this embodiment involves journals of continuous sequence number being written into a continuous tape region. A journal of a particular sequence number is written in a tape ahead of the journal of the subsequent sequence number. This means that the required journals can be sequentially read and, in turn, ensures that frequent tape forwarding and rewinding during restore is prevented. While sequence number is taken in this embodiment as the information for expressing the update sequence (write sequence), this may be replaced by other types of information including write time and date (time stamp).

In addition, as described above, while in this embodiment the restore point volume of a particular consistency group is not restricted to the duplicated volume of the particular consistency group and another volume may be used, this other volume should be a volume that is related to the duplicated volume. This is to maintain the consistency of the particular consistency group. When restore to another volume has occurred, copy of the data of this other volume may be performed by way of one or a plurality of volumes, or by forming a pair in which the other volume is taken as the primary volume and the duplicated volume is taken as the secondary volume. Examples of the former include a method in which there is association between a single primary volume and a plurality of secondary volumes (multi-target system), and a method in which there is association between a single primary volume and a secondary volume and association between this secondary volume and a separate secondary volume in which this secondary volume serves as a primary volume (multi-target method). Examples of copy based on the multi-up method and the multi-target method include the techniques disclosed in, for example, Japanese Unexamined Patent Application No. 2006-065624 and Japanese Unexamined Patent Application No. 2006-065629 (U.S. patent Ser. No. 10/972,246). These apply also to journals. That is to say, instead of the direct copy of a journal volume to a tape, the journal may be copied from, for example, a first journal volume to a second journal volume, the journal then being copied from the second journal volume to the tape. The phrase "copied from a journal volume to the tape" may incorporate either meaning.

In addition, for a journal pool with a plurality of journal volumes, the storing performed by the journal program when a particular journal volume becomes full with journal data may involve the sequential switchover of the storage point volume to house the journal data in a subsequent journal volume. The storing processing to the tape pertaining to the volume in question may be initiated at this time at the moment a particular journal volume becomes full up with journal data.

Embodiment 2

A second embodiment of the present invention that focuses on the main points of difference with the first embodiment and abridges or omits the description of those points common to the first embodiment will be hereinafter described. The same applies for a subsequently described third embodiment of the present invention.

FIG. 18 is an explanatory diagram of the copy threshold value and a value compared therewith.

As shown in the diagram, in addition to or instead of the data quantity and/or CP value, elapsed time may serve as the copy threshold value. The elapsed time of a consistency group constitutes the elapsed time between the copy of a journal of a consistency group was performed at a particular previous point in time (for example, the final point) until the current time. Copy is executed when this elapsed time exceeds the copy threshold value.

For example, copy is performed frequently when, as the copy threshold value for high priority, a short elapsed time is set, while on the other hand, as the copy threshold value of lower priority thereof, a longer elapsed time is set and, as result, the frequency at which copy is performed is lessened.

Embodiment 3

In the third embodiment, backup of a journal to a tape is controlled from the standpoint of DLCM (Data Life Cycle Management) (or ILM (Information Lifecycle Management).

FIG. 19 shows an example configuration of a DLCM management table.

The correspondence relationship between the CTG-ID and DLCM importance is recorded in the DLCM management table 4152. That is to say, the level of DLCM importance in a consistency group is recorded in this table.

Here, the DLCM importance denotes importance based on DLCM and, for example, constitutes a value for expressing data importance and data usage frequency and so on. One type or a plurality of value types may be set as the value denoting DLCM importance. The DCLM importance is described as importance based on DLCM and, therefore, carries a different meaning to the "priority" noted above. The DCLM importance value can be caused to change in accordance with the elapsed time or access frequency. For example, low access frequency volume can cause the DCLM frequency in a storage device inner part to change to a low value. In addition, the DCLM importance can be gradually changed to a low value on the basis of the elapsed time from when data has been stored.

The DCLM management table 4152 may by supported by the data control program 118. The data control program 118 gives priority to the backup to a tape of journals of a consistency group of low DLCM importance over those of a consistency group of high DLCM importance and, thereafter, deletes these journals from the journal volume. That is to say, the journals of a consistency group of high DLCM importance are accumulated in the disk device, and the journals of the consistency group of low DLCM importance are migrated to a tape.

While several preferred embodiments of the present invention are described above, these examples are used for the purpose of describing the present invention and, accordingly, the scope of the present invention should not be deemed to be limited to these embodiments alone. The present invention may be carried out in a range of other modes. For example, the various tables may be replaced with information of other format types other than a table.

What is claimed is:

1. A storage system comprising at least one random storage device which constitutes a storage device of a type able to perform high-speed random access processing, and in which the at least one random storage device comprises a volume group and a journal volume, and the volume group containing a volume pair configured from a primary volume and secondary volume, and which whenever data is received from a host device, writes the received data in the primary volume, produces a journal which contains a write sequence of the data written in the primary volume and the data, and writes the journal in the journal volume, wherein the storage system comprises:
a plurality of sequential storage devices that constitute a storage device of a type that is able to perform high-speed sequential access processing but is unable to perform high-speed random access processing,
a backup unit that writes a plurality of journals accumulated in the journal volume in at least one of the plurality of sequential devices, and
a restore unit that, based on the write sequence recorded in each of the plurality of journals that are recorded in at least one of the plurality of sequential devices, restores the data of the journals stored in the primary volume to the secondary volume of the primary volume or a volume related to the secondary volume,
wherein the volume groups exist in plurality, and the backup unit controls backup in response to a comparison of the threshold value of each of the plurality of volume groups and a prescribed type value pertaining to the volume groups, and
wherein a checkpoint is written in the journal volume at a prescribed moment, and the prescribed type value constitutes the number of checkpoints of the volume group correspondent to the value which have not been reflected in the sequential device.

2. The storage system according to claim 1, wherein
the volume groups exist in plurality,
sequential device groups of the plurality of sequential devices are configured from one or more sequential devices,
sequential device groups have association with volume groups respectively,
the backup unit writes a journal for backup into the sequential device group correspondent to the volume group containing the primary volume in which the data of the journal is stored, and
the restore unit restores the data of the journal recorded in the sequential device group to the secondary volume of the volume group correspondent to the sequential device group or a volume related thereto.

3. The storage system according to claim 1, wherein
a checkpoint is written in the journal volume at a prescribed moment,
the backup unit, when the checkpoint is written from the journal volume into a sequential device, writes a mark for positioning an access position of the sequential device, and
the restore unit sets the position of the mark recorded in the sequential device in the access position and restores the data of the journal beyond the access position.

4. The storage system according to claim 1, wherein
the backup unit, when the prescribed type value of a first volume group exceeds a first threshold value correspondent to the first volume group, performs backup of the primary volume journal of the first volume group.

5. The storage system according to claim 1, comprising a sequential device drive and a set control unit that controls which sequential device is set in the sequential device drive, wherein
the sequential device drive receives a journal from the backup unit and writes the received journal in the sequential device set for itself and sends a journal read from the sequential device to the restore unit,
sequential device groups of the plurality of sequential devices are configured from one or more sequential devices,
sequential device groups have association with volume groups respectively, and
the backup unit, when a first of the prescribed type value of a first volume group exceeds a first threshold value correspondent to the first volume group and a sequential device of a second sequential device group correspondent to a secondary volume group in which a second of the prescribed type value does not exceed a second threshold value, sets, in place of the sequential device, a sequential device belonging to a first sequential device group correspondent to the first volume group in the sequential device drive so as to perform backup to the sequential device.

6. The storage system according to claim 1, wherein
the prescribed type value constitutes the data quantity of one or more journals of a volume group correspondent to the value that has not been backed-up to a sequential device.

7. The storage system according to claim 1, wherein the prescribed type value is an elapsed time from when backup has been previously performed at a particular time to the current time.

8. The storage system according to claim 1, wherein
the volume groups exist in plurality, and
the backup unit gives priority to journals of low importance over those of high importance to be backed-up to a sequential device.

9. The storage system according to claim 1, further comprising:
a GUI supply unit that supplies GUI for which a user inputs threshold values for each volume group; and
a threshold value setting unit that sets the threshold values input by way of the GUI with association to the volume groups.

10. The storage system according to claim 1,
further comprising a restore management unit that manages a restore finish point that expresses the extent to which data of which journal has been restored in each of the secondary volumes or to volumes related thereto, wherein
the restore unit, when restore to a particular point has been designated, specifies the restore finish point correspondent to a restore-targeted volume, and restores the data of the journal from the specified restore point to the designated point to the secondary volumes or to volumes related thereto.

11. The storage system according to claim 1, further comprising a journal delete unit for deleting journals that have been backed-up in a sequential device from the journal volume.

12. The storage system according to claim 1, wherein
the volume groups exist in plurality,
sequential device groups of the plurality of sequential devices are configured from one or more sequential devices,
primary volume journals of the plurality of volume groups are written in one of the journal groups configured from a plurality of journal volumes,
the backup unit selects journals of a particular volume group from the journal pool and writes the journals in the same sequential device group, and
the restore unit reads the journals from the same sequential device group and restores the data of the journals to the secondary volumes of the particular volume groups or to volumes related thereto.

13. The storage system according to claim 1, wherein
the volume groups exist in plurality,
journal pools configured from a plurality of journal volumes are provided in plurality,
sequential device groups of the plurality of sequential devices configured from one or more sequential devices are provided, and
the plurality of journal pools and plurality of sequential device groups each have association with the plurality of volume groups, and
the journal of a particular volume group of the plurality of volume groups is written into the journal volume of a particular journal pool correspondent to the particular volume group,
the backup unit performs backup of the journal of a particular journal volume of the particular journal pool to a sequential device of a particular sequential device group correspondent to the particular journal pool, and
the restore unit restores the data of the journal read from a sequential device of the particular sequential device group to the secondary volume of the particular volume group correspondent to the sequential device group or to a volume related thereto.

14. The storage system according to claim 1, wherein
a checkpoint is written in the journal volume at a prescribed moment,
the volume groups exist in plurality,
sequential device groups of the plurality of sequential devices are configured from one or more sequential devices,
sequential device groups have association with volume groups respectively,
the backup unit writes a journal for backup into a sequential device of a sequential device group correspondent to the volume group containing the primary volume in which the data of the journal is stored and, when the checkpoint is written in the sequential devices, writes a mark for positioning an access position of the sequential device, and
the restore unit sets the position of the mark recorded in the sequential device in the access position and restores the data of the journal beyond the access position to a secondary volume of a volume group correspondent to the sequential device group that the sequential device comprises or a volume related thereto.

15. The storage system according to claim 14, wherein
the backup unit controls backup in response to a comparison of each of the threshold values of the plurality of volume groups and the prescribed type value of each of the volume groups to be updated.

16. The storage system according to claim 5, wherein
the backup unit, when the sequential device of a sequential device group correspondent to a third volume group of lower priority than the first volume group has been set in the sequential device drive, performs switchover of the sequential device to a sequential device of a first sequential device group correspondent to the first volume group.

17. The storage system according to claim 1, comprising a sequential device drive and a set control unit that controls which sequential device is set in the sequential device drive, wherein
the sequential device drive receives a journal from the backup unit and writes the received journal in a sequential device set for itself and sends a journal read from the sequential device to the restore unit,
sequential device groups of the plurality of sequential devices are configured from one or more sequential devices, and
sequential device groups have association with volume groups respectively,
the restore unit, when a sequential device of a sequential device group correspondent to a secondary volume group of lower priority than the first volume group is set in the sequential device drive, performs switchover of the sequential device to a sequential device of a first sequential device group correspondent to the first volume group.

18. A backup/restore method executed by a storage system comprising at least one random storage device which constitutes a storage device of a type able to perform high-speed random access processing and a plurality of sequential storage devices which constitute a storage device of a type that is able to perform high-speed sequential access processing but unable to perform high-speed random access processing,
the method comprising the steps of:
(A) whenever data is received from a host device, writing the received data in a primary volume from which a volume pair of a volume group provided in the one or more random storage devices is configured, producing a journal that contains a write sequence of data written in the primary volume and the data, and writing the journal in a journal volume provided in the one or more random storage devices;
(B) writing a plurality of journals accumulated in the journal volume in at least one of the plurality of sequential devices; and
(C) based on the write sequence recorded in each of the plurality of journals recorded in at least one of the plurality of sequential devices, restoring the data of the journals to the primary volume for storing of the data and the secondary volume from which the volume pair is configured or a volume related thereto;
wherein the volume groups exist in plurality, and a backup is controlled in response to a comparison of a threshold value of each of the plurality of volume groups and a prescribed type value pertaining to the volume groups,
wherein a checkpoint is written in the journal volume at a prescribed moment, and
wherein the prescribed type value constitutes the number of checkpoints of the volume group correspondent to the value which have not been reflected in the sequential device.

19. A storage system which comprises at least one random storage device which constitutes a storage device of a type able to perform high-speed random access processing, and in which the at least one random storage device comprises a plurality of volume groups and a journal volume, and each of the volume groups containing a volume pair configured from a primary volume and secondary volume, and which whenever data is received from a host device, writes the received data in the primary volume, produces a journal which contains a write sequence of the data written in the primary volume and the data, and writes the journal in the journal volume,
wherein the storage system comprises a plurality of sequential storage devices that constitute a storage device of a type that is able to perform high-speed sequential access processing but is unable to perform high-speed random access processing,
a backup unit that writes a plurality of journals accumulated in the journal volume in at least one of the plurality of sequential devices,
a restore unit that, based on the write sequence recorded in each of the plurality of journals that are recorded in at least one of the plurality of sequential devices, restores the data of the journals stored in the primary volume to the secondary volume of the primary volume or a volume related the secondary volume,
a sequential device drive, and
a set control unit that controls which sequential device is to be set in the sequential device drive, wherein
the sequential device drive receives a journal from the backup unit, and writes the received journal in the sequential device set in the sequential device drive,
a plurality of sequential device groups are configured from the plurality of sequential devices,
each sequential device group is configured from one or more sequential devices,
sequential device groups and switchover threshold values have association with volume groups respectively,
the switchover threshold value is a threshold value for determining whether to switch the sequential device set in the sequential device drive to another sequential device for copying,
the backup unit, when a prescribed type value of a first volume group exceeds a switchover threshold value correspondent to the first volume group and a second sequential device is set in the sequential device drive, sets, in place of the second sequential device, a first sequential device in the sequential device drive so as to perform backup of a journal for the first volume group to the first sequential device, the second sequential device is a sequential device belonging to a sequential device group correspondent to a second volume group, the second volume group is a volume group in which a prescribed type value of the volume group does not exceed a switchover threshold value, and the first sequential device is a sequential device belonging to a first sequential device group correspondent to the first volume group.

20. The storage system according to claim 19 wherein priorities have association with volume groups respectively, switchover threshold values and copy threshold values have association with the priorities, switchover threshold values and copy threshold values correspondent to the volume groups are switchover threshold values and copy threshold values associated with the priorities correspondent to the volume groups, the copy threshold value is a threshold value for determining whether to perform backup of a journal to the sequential device, the backup unit (A) even if the prescribed type value of the first volume group does not exceed a switchover threshold value correspondent to the first volume group, if the prescribed type value exceeds a copy threshold value correspondent to the first volume group, performs backup of a journal for the first volume group to the first sequential device, (B) when the prescribed type value of the first volume group exceeds a switchover threshold value correspondent to the first volume group and a sequential device set in the sequential device drive is not the second sequential device but the third sequential device, sets in place of the third sequential device, the first sequential device to the sequential device drive so as to perform backup of the journal for the first volume group to the first sequential device, the third sequential device is a sequential device belonging to the sequential device group correspondent to a third volume group, and the third volume group is a volume group correspondent to the priority lower than that correspondent to the first volume group.

21. The storage system according to claim 19, wherein priorities have association with volume groups respectively, the backup unit, when the prescribed type value of the first volume group exceeds a switchover threshold value correspondent to the first volume group and a sequential device set in the sequential device drive is not the second sequential device but the third sequential device, sets in place of the third sequential device, the first sequential device to the sequential device drive so as to perform backup of the journal for the first volume group to the first sequential device, the third sequential device is a sequential device belonging to the sequential device group correspondent to a third volume group, and the third volume group is a volume group correspondent to the priority lower than that correspondent to the first volume group.

22. The storage system according to claim 21, wherein switchover threshold values have association with the priorities, and switchover threshold values correspondent to the volume groups are switchover threshold values associated with the priorities correspondent to the volume groups.

23. The storage system according to claim 19, wherein copy threshold values have association with volume groups, respectively, the copy threshold value is a threshold value for determining whether to perform backup of a journal to the sequential device, and the backup unit, even if the prescribed type value of the first volume group does not exceed a switchover threshold value correspondent to the first volume group, if the prescribed type value exceeds a copy threshold value correspondent to the first volume group, performs backup of a journal for the first volume group to the first sequential device.

24. A backup/restore method executed by a storage system which comprises (1) at least one random storage device which constitutes a storage device of a type able to perform high-speed random access processing, and in which the at least one random storage device comprises a plurality of volume groups and a journal volume, and each of the volume groups having a prescribed value type and containing a volume pair configured from a primary volume and secondary volume, and which whenever data is received from a host device, writes the received data in the primary volume, produces a journal which contains a write sequence of the data written in the primary volume and the data, and writes the journal in the journal volume, (2) a plurality of sequential storage devices that constitute a storage device of a type that is able to perform high-speed sequential access processing but is unable to perform high-speed random access processing, said sequential devices being configured into a plurality of sequential device groups, each sequential device group having at least one sequential device, and (3) a sequential device drive in which selected sequential devices are set, said sequential device drive being operative to receive a journal and write the received journal in the sequential device that is set;

the method comprising the steps of:

(A) whenever data is received from a host device, writing the received data in a primary volume from which a volume pair of a volume group provided in the one or more random storage devices is configured, producing a journal that contains a write sequence of data written in the primary volume and the data, and writing the journal in a journal volume provided in the one or more random storage devices;

(B) writing a plurality of journals accumulated in the journal volume in at least one of the plurality of sequential devices;

(C) based on the write sequence recorded in each of the plurality of journals recorded in at least one of the plurality of sequential devices, restoring the data of the journals to the primary volume for storing of the data and the secondary volume from which the volume pair is configured or a volume related thereto;

(D) selecting one of a plurality of switchover threshold values, said threshold values being associated with a respective sequential device group and volume group, for determining whether to switch the sequential device set in the sequential device drive to another sequential device for copying, and (E) when a prescribed type value of a first volume group exceeds a switchover threshold value correspondent to the first volume group and a second sequential device is set in the sequential device drive, sets, in place of the second sequential device, a first sequential device in the sequential device drive so as to perform backup of a journal for the first volume group to the first sequential device, wherein the second sequential device is a sequential device belonging to a sequential device group correspondent to a second volume group, the second volume group is a volume group in which a prescribed type value of the volume group does not exceed a switchover threshold value, and the first sequential device is a sequential device belonging to a first sequential device group correspondent to the first volume group.

* * * * *